United States Patent [19]

Girling

[11] Patent Number: 4,583,868
[45] Date of Patent: Apr. 22, 1986

[54] TEMPERATURE DIFFERENTIAL DETECTION DEVICE

[75] Inventor: Peter M. Girling, Allentown, Pa.

[73] Assignee: International Coal Refining Company, Allentown, Pa.

[21] Appl. No.: 538,456

[22] Filed: Oct. 3, 1983

[51] Int. Cl.$^4$ .................. G01K 3/08; G01K 7/24
[52] U.S. Cl. .................. 374/114; 374/115; 374/112; 374/141
[58] Field of Search .................. 374/114, 10, 12, 112, 374/141, 144, 147, 185, 137, 115; 323/365, 367, 366, 369

[56] References Cited

U.S. PATENT DOCUMENTS

| | | | |
|---|---|---|---|
| 2,050,878 | 8/1936 | Dallman et al. | 374/114 |
| 2,395,192 | 2/1946 | Ostergren | 374/30 |
| 3,225,297 | 12/1965 | Burley et al. | 323/365 |
| 3,236,099 | 2/1966 | Warthen | 374/114 |
| 3,651,694 | 3/1972 | Lamb | 374/114 |
| 4,384,793 | 5/1983 | O'Brien | 374/115 |

*Primary Examiner*—Charles Frankfort
*Assistant Examiner*—Thomas B. Will

[57] ABSTRACT

A temperature differential detection device for detecting the temperature differential between predetermined portions of a container wall is disclosed as comprising a Wheatstone bridge circuit for detecting resistance imbalance with a first circuit branch having a first elongated wire element mounted in thermal contact with a predetermined portion of the container wall, a second circuit branch having a second elongated wire element mounted in thermal contact with a second predetermined portion of a container wall with the wire elements having a predetermined temperature-resistant coefficient, an indicator interconnected between the first and second branches remote from the container wall for detecting and indicating resistance imbalance between the first and second wire elements, and connector leads for electrically connecting the wire elements to the remote indicator in order to maintain the respective resistance value relationship between the first and second wire elements. The indicator is calibrated to indicate the detected resistance imbalance in terms of a temperature differential between the first and second wall portions.

9 Claims, 2 Drawing Figures

TEMPERATURE DIFFERENTIAL DETECTION DEVICE

The Government of the United States of America has rights in this invention pursuant to Contract No. DE-AC05-780R03054 (as modified) awarded by the U.S. Department of Energy.

BACKGROUND OF THE INVENTION

This invention relates to a temperature differential detection device and more particularly to a device and technique for detecting hot spots in heavy wall vessels and containers.

In the utilization of heavy wall vessels at elevated temperatures and pressures, it is desirable to monitor the temperature of the vessel wall for the occurrence of "hot spots". For example, in the solvent refined coal process (SRC-I) for direct coal liquefaction such as generally referred to in U.S. Pat. No. 4,272,501 and U.S. Pat. No. 4,397,732, the detection of the existence of hot spots in the walls of various process vessels, such as dissolvers or reactors, is necessary. The existence of hot spots in the walls of such process vessels can produce undesirable and detrimental coking. Accurate and reliable detection of such hot spots permits timely corrective procedures to prevent such undesirable coking. Furthermore, in the "second-stage" hydrocracking of SRC-I liquified and deashed product streams, the existence of hot spots in the wall of the catalytic reactor (i.e., expanded-bed hydrocracker) can indicate the possibility of wall failure.

Since many of the process steps in the solid refined coal process are accomplished at elevated pressures, it is also desirable to minimize any penetration of the reaction vessel wall and, accordingly, it is advantageous to be able to detect hot spots without the necessity for vessel wall penetration.

Accordingly, it is an object of the present invention to provide a new and improved temperature differential detection device for accurately detecting hot spots in a vessel or container wall without penetration thereof.

Another object of the invention is to provide a temperature differential detection device for accurately detecting a temperature differential between predetermined wall portions of a vessel or container wall.

A further object of the invention is to provide a temperature differential detection device that detects average temperature over an extended circumferential path of a container wall.

A still further object of the invention is to provide a temperature differential detection device which is durable and long lasting in use and is economical to manufacture.

SUMMARY OF THE INVENTION

It has been found that the foregoing and related objects and advantages can be obtained in a temperature differential detection device which includes a Wheatstone bridge circuit for detecting resistance imbalance having a first circuit branch, a second circuit branch and an indicator interconnected between the first and second circuit branches for detecting and indicating resistance imbalance. The first circuit branch has a first elongated wire element adapted for mounting in heat transfer relationship with a first wall portion of a container wall remotely disposed from the indicator. The second circuit branch has a second elongated wire element adapted for mounting in heat transfer relationship with a second wall portion of the container wall remotely disposed from the indicator. The first and second wire elements have a predetermined temperature-resistance coefficient and are connected to the indicator by connector leads which maintain the respective resistance value relationship between the first and second wire elements. The indicator is calibrated to indicate a detected resistance imbalance between the first and second wire elements as a temperature differential of the first and second wall portions. A balancing element is connected to the first and second circuit branches for balancing the circuit so the indicator registers a zero temperature differential when the first and second wire elements are at the same temperature.

DESCRIPTION OF THE PREFERRED EMBODIMENT

Figure 1:
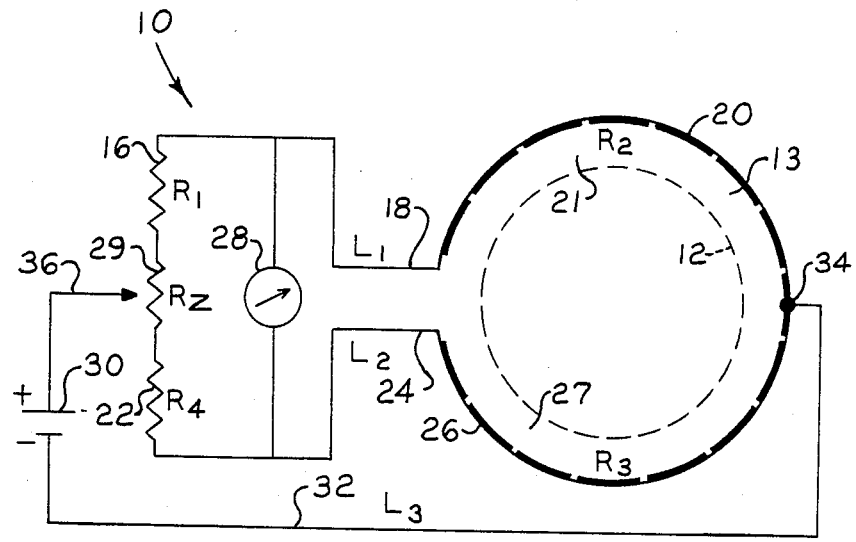
FIG. 1 is a diagrammical view of the temperature differential detection device of this invention as connected to a heavy wall reaction vessel shown in phantom line.

Referring to FIG. 1, the temperature differential detection device of the present invention is generally designated by the numeral 10 and is shown mounted to a reaction vessel or container 12. For purposes of explanation, reaction vessel 12 is depicted (in phantom line) as a heavy wall vessel intended for operation at elevated pressure and temperature and having a ten-inch thick steel wall (with its outer circumference shown in heavier phantom line). It is understood, however, that the temperature differential detection device of the present invention may be utilized with a wide variety of vessels and containers wherein it is advantageous to determine temperature differential between distinct portions of the container wall and in a temperature range of 200° F.–1,500° F.

The detection device 10 utilizes a Wheatstone bridge circuit configuration for accurately determining a change in resistance or a resistance imbalance, and incorporates elongated temperature-dependent resistance elements (for sensing temperature) as active elements of the Wheatstone bridge to thereby accurately detect temperature differential. In the illustrated embodiment, the electrical circuit 14 is configured in the form of the Wheatstone bridge shown in FIG. 2 with a first branch having a resistor 16 connected in series by connector lead 18 to an elongated wire element 20 and a second branch having a resistor element 22 connected in series by a connector lead 24 to an elongated wire element 26. An imbalance indicator 28, such as a galvanometer, is interconnected across the first and second branches between the connection of connector lead 18 to resistor 16 and the connection of connector lead 24 to resistor 22.

A potentiometer 29 interconnects resistor element 16 and resistor element 22. A DC voltage source 30 is connected in series by conductor lead 32 to the connection point 34 between the elongated wire elements 20, 26. The wiper arm 36 of potentiometer 29 is connected to voltage source 30 to permit balancing of the Wheatstone bridge circuit. Other acceptable balancing elements may be utilized in place of the potentiometer.

The elongated wire elements 20, 26 are mounted in heat transfer relationship with selected portions of the wall 13 of vessel 12 so that temperature changes in the selected wall portions produce a temperature change in the respective wire elements which correspondingly produces measurable changes in the resistance value of said wire elements. For example, equal temperature changes in the wire elements will produce equal resistance value changes in the wire elements and so the respective resistance value relationship or ratio between the wire elements remains unchanged (and the Wheatstone bridge circuit would remain in balance).

In the illustrated embodiment, the elongated wire element 20 is disposed in noncoiling orientation about one-half the outer circumference of vessel 12 in thermal contact with, and electrically isolated from, the selected wall portion 21 of vessel wall 13. The elongated wire element 26 is disposed in noncoiling, nonoverlapping orientation about the opposing circumferential half of vessel 12 in thermal contact with, and electrically isolated from, the selected wall portion 27. Adhesive material or acceptable mechanical connectors may be utilized for mounting the wire elements 20, 26 in heat transfer relationship or thermal contact with the vessel wall 13. In so mounting the wire elements to the vessel wall 13, it is desirable that the tension in the wire elements be equal or uniform so as to prevent any unbalancing effect on the relative resistance values of the wire elements 20, 26 due to unequal wire tension.

The elongated wire elements 20, 26 are preferably comprised of conductive material having a temperature-resistance coefficient predetermined to be a constant, or approximately constant, value over the range of temperature change of the vessel wall 13. A constant temperature-resistance coefficient will produce a linear resistance change in response to a change in temperature of the wire elements 20, 26. Although a constant temperature-resistance coefficient facilitates accurate determination of temperature differential and calibration of the galvanometer 28 for direct indication of temperature differential, acceptable detection may also be obtained so long as the resistance of the wire elements changes in a known, predictable manner relative to temperature change. Metals believed acceptable for the wire elements 20, 26 include nickel and platinum. It is also expected that stainless steel, iron, copper, hastalloy, incoloy and other alloys may also be utilized.

The connector leads 18, 24 electrically connect the wire elements 20, 26 to the galvanometer 28 so as to maintain the respective resistance value relationship between the wire elements as seen by the galvanometer and avoid errors introduced by lead resistance. That is, the resistance value of the connector leads 18, 24 does not detrimentally affect or influence the accurate detection by galvanometer 28 of any resistance imbalance between the wire elements 20, 26. To this end, the connector leads 18, 24 are both comprised of the same conductive material (so as to exhibit matching resistance value characteristics) and, being of identical length, are positioned to follow nearly the same path in interconnecting the wire elements 20, 26 respectively to the remotely positioned indicator 28. Because of the matching nature and path of the connector leads 18, 24, the respective resistance value relationship between the wire element 20 and the wire element 26 is maintained to allow the indicator 28 to detect any resistance imbalance between the wire elements 20, 26 without a disproportionate influence from one of the connector leads 18, 24. Preferably, the connector leads 18, 24 are combined as twin connectors in a single cable thereby virtually following the same path. Such a configuration is particularly beneficial in applications wherein substantially long connector leads are required, e.g., hundreds of feet, although other means for connecting the wire elements 20, 26 to the indicator 28 may be acceptable as long as such connectors do not adversely affect the respective resistance values of the wire elements 20, 26 as seen by the remote indicator 28 over the operational temperature range.

In the illustrated embodiment, the indicator 28 is diagrammatically depicted in the form of a galvanometer although other acceptable indicators may be utilized such as a differential amplifier, a current transducer, a current amplifier, etc. Preferably, the indicator is calibrated to display any detected resistance imbalance between the wire elemente 20, 26 in terms of a temperature differential, e.g., average temperature difference. Calibration can be accomplished with a knowledge of the values of the fixed resistors 16, 22 together with the temperature-resistance coefficient of the wire elements 20, 26. Also, the resistance values of the conductor leads 18, 24 may be measured to insure their uniformity. Under normal operating conditions, the average temperature difference as displayed on indicator 28 approaches a zero value.

Figure 2:
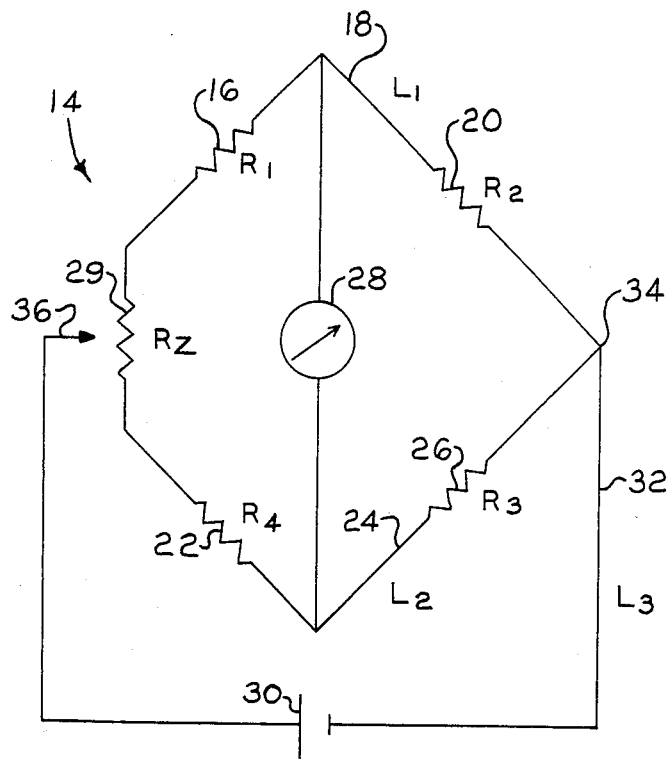
FIG. 2 is a schematic view of the electrical circuit of the temperature differential detection device of the present invention.

In the Wheatstone bridge circuit configuration of FIG. 2, it is preferred that $R_1=R_4$ and $R_2=R_3$ for purposes of simplicity. For complete symmetry, the following relative resistance values would pertain: $R_1=R_2=R_3=R_4$ and $L_1+L_2=R_z$. Other resistance value relationships could be utilized as long as the Wheatstone bridge circuit can be balanced to a zero indication and the resistance value of the wire elements changes with respect to temperature in a known manner. It is also expected that various forms of Wheatstone bridge circuits may be utilized with corresponding adaptations to achieve the desired function of detecting the resistance imbalance between the elongated wire elements. Furthermore, an AC voltage source can be utilized in the invention herein and is probably preferable for some applications since it would facilitate galvanometer amplification.

To balance the Wheatstone bridge circuit prior to operation, the wiper arm 36 is adjusted accordingly so that the indicator 28 displays a "zero" reading when the wire elements 20, 26 are at the same temperature. With the Wheatstone bridge in balance, any subsequent resistance imbalance in either the first or second branch will produce a proportional indication in the indicator 28.

In operation, a change in temperature of the vessel wall 13 will produce a corresponding change in the resistance value of the elongated wire elements 20, 26. If the temperature change in the vessel wall 13 is uniform so that the wall portion 21 in thermal contact with elongated wire element 20 is at the same average temperature as the wall portion 27 in thermal contact with elongated wire element 26, the resistance value of wire element 20 will change the same amount as the resistance value of wire element 26 since they are the same length and have the same temperature-resistance coefficient. Since the resistance value of the wire elements 20, 26 changes the same amount, the Wheatstone bridge circuit remains in balance and the indicator 28 does not indicate any imbalance or, in other words, there is a zero temperature differential between wall portion 21 and wall portion 27.

Upon the occurrence of a hot spot within wall portion 21 or wall portion 27, an imbalance between the resistance values of wire elements 20, 26 will occur since the temperature of the respective wire element adjacent the hot spot will be disproportionately higher. The indicator 28 will detect the resistance imbalance and indicate such imbalance in terms of a temperature differential between the wall portions 21, 27. The indicator 28 will also identify the wall portion of higher temperature either by the direction of deflection of the pointer in the case of a galvanometer or by equivalent means in other types of indicators. Thus, the occurrence and location of a hot spot is detected along with an accurate determination of temperature differential.

Through the use of multiple pairs of wire elements positioned out of phase along the perimeter of the vessel wall, the location of a hot spot can be more precisely determined than simply locating it in one-half of the vessel wall. For example, the positioning of three pairs of opposing wire elements 120 degrees out of phase could be utilized to locate the hot spot within a third of the vessel wall. Additional pairs in various configurations may be utilized to locate such hot spots even more precisely.

Thus, a temperature differential detection device is provided for accurately detecting hot spots in a vessel or container wall without undesirable penetration of the wall. Accurate detection of temperature differential is also attainable in a device which is durable and long lasting in use. Other adaptions and utilizations of the invention will be apparent to persons skilled in the art, such as the determination of storage tank average temperature for inventory control and the determination of reactor average temperature (thereby replacing or supplementing a series of thermocouples).

I claim:

1. In combination with a container wall, apparatus for detecting temperature changes between first and second half portions of the wall along a preselected plane comprising
   (a) Wheatstone bridge circuit means, including
      (1) a first circuit branch having first and second ends the first end of which is connected to said Wheatstone bridge circuit means and further including a first elongated wire element having a predetermined temperature-resistance coefficient extending in heat exchange relationship along a first half portion of the outer circumference of the container wall along a preselected plane;
      (2) a second circuit branch having first and second ends the first end of which is connected to said Wheatstone bridge circuit means and further including a second elongated wire element having the same temperature-resistance coefficient as said first elongated wire element and extending in nonoverlapping relationship relative to said first wire element and in heat exchange relationship along the opposing second half of the outer circumference of the container wall in said preselected plane, the temperature-resistance coefficient of said first and second wire elements being generally constant over a predetermined temperature range and said respective second ends of said first and second circuit branches being connected together at a point from which point said ends are further connected to said Wheatstone bridge circuit means;
      (3) indicator means connected with said first and second circuit branches for detecting and indicating a resistance imbalance between said first and second wire elements corresponding to a temperature differential between the average temperature of the container wall first half and second half portions of the outer circumferences of the container wall; and
      (4) means for adjusting said indicator means to indicate zero temperature differential when said first and second wire elements are at the same temperature; and
   (b) connector lead means including first and second conductor leads having matching resistance values and the same temperature-resistance coefficient, said first and second conductor leads connecting said first and second wire elements with said indicator means, respectively, thereby to maintain the resistance value relationship between said first and second wire elements.

2. The device of claim 1 wherein the resistance value of said first wire element equals the resistance value of said second wire element.

3. The device of claim 1 wherein said adjustment means is a potentiometer.

4. The device of claim 1 wherein said first branch includes a first resistor and said second branch includes a second resistor being of equal resistance value.

5. The device of claim 4 wherein said first and second wire elements are of equal resistance value.

6. The device of claim 1 wherein said indicator means comprises a galvanometer.

7. The device of claim 1, wherein said first and second conductor leads have the same length and are formed of the same conductive material and are portions of a single cable.

8. The device of claim 1, wherein said first and second wire elements extend along said container wall in noncoiling orientation.

9. The device of claim 1, wherein said first circuit branch comprises a first resistor connected in series with said first conductor lead and said first wire element, said first wire element having a terminus end remote from said first conductor lead, and further wherein
   said second circuit branch comprises a second resistor connected in series with said second conductor lead and said second wire element, said second wire element having a terminus end remote from said second conductor lead and being electrically connected to said terminus end of said first wire element to connect said first and second branches at one end, and further wherein
   a potentiometer interconnects said first and second branches at the other end with the shunt element of said potentiometer connected in series with a voltage source connected in series with said terminus ends of said first and second wire elements, said potentiometer being operable to adjust said indicator means to zero when said first and second wall portions are at an equal temperature.

* * * * *